Figure 4:
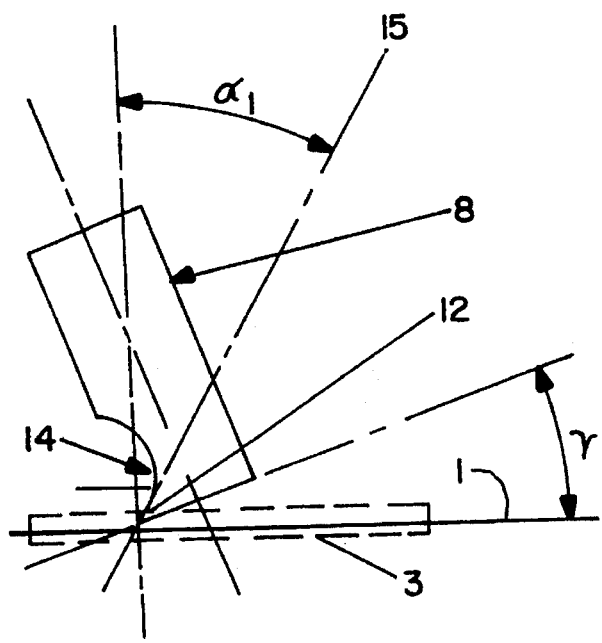

United States Patent [19]

Witt

[11] Patent Number: 5,619,898
[45] Date of Patent: Apr. 15, 1997

[54] PROCESS AND DEVICE FOR MECHANICALLY REMOVING A LAYER FROM THE SUBSTRATE MATERIAL OF A DISK-SHAPED INFORMATION CARRIER

[76] Inventor: Georg Witt, Helmstedter Str. 58 H, 38126 Braunschweig, Germany

[21] Appl. No.: 232,155
[22] PCT Filed: Sep. 15, 1992
[86] PCT No.: PCT/DE92/00803
  § 371 Date: Jul. 11, 1994
  § 102(e) Date: Jul. 11, 1994
[87] PCT Pub. No.: WO94/06608
  PCT Pub. Date: Mar. 1, 1994
[51] Int. Cl.⁶ ............................................. B26D 3/00
[52] U.S. Cl. .................... 83/870; 83/395; 83/451; 83/948
[58] Field of Search ................. 83/870, 874, 733, 83/915.5, 856, 871, 872, 873, 948, 451, 395; 29/81.11

[56] References Cited

U.S. PATENT DOCUMENTS

| | | | |
|---|---|---|---|
| 1,031,694 | 7/1912 | Deats | 83/410.7 |
| 3,066,714 | 12/1962 | Qualheim | 83/395 |
| 3,733,997 | 5/1973 | Beasley | 83/874 |
| 4,083,739 | 4/1978 | Stahl | 83/870 |
| 4,271,740 | 6/1981 | Yamazaki et al. | 83/915.5 |
| 4,898,058 | 2/1990 | Siefert | 83/870 |
| 5,013,392 | 5/1991 | Virgadamo | 83/870 |
| 5,099,618 | 3/1992 | Schmid | 51/326 |
| 5,148,729 | 9/1992 | Krumdieck | 83/915.5 |
| 5,199,143 | 4/1993 | DeFazio | 451/63 |
| 5,220,754 | 6/1993 | Tayabi et al. | 51/281 SF |
| 5,400,843 | 3/1995 | Gonner et al. | 83/870 |

FOREIGN PATENT DOCUMENTS

| | | |
|---|---|---|
| 0286961 | 10/1988 | European Pat. Off. . |
| 0432832 | 6/1991 | European Pat. Off. . |
| 1471513 | 3/1967 | France ............ 83/870 |
| 3511711 | 10/1986 | Germany . |
| 3816561 | 3/1989 | Germany . |

OTHER PUBLICATIONS

Patent Abstracts of Japan, vol. 16, No. 43, (C–907), abstract of Hara, "Production of Stamper for Optical Disk", Japanese 3–247788, Nov. 5, 1991.

Primary Examiner—Kenneth E. Peterson
Attorney, Agent, or Firm—Foley & Lardner

[57] ABSTRACT

A foreign substances-containing layer of a disk-shaped information carrier (3) is mechanically removed from the substrate material (13) in order to recover the substrate material (13) by a material removing process which separates the coating containing the foreign substances (18, 19, 20) from the substrate material (13). A device for implementing this process consists of a tool bottom part (1), a receptacle (2) for holding in place the disk-shaped information carrier (3), and a tool top part (7) movable with respect to the tool bottom part (1) in a direction parallel to the surface of the latter and provided with a blade (8) for peeling a layer (9) off the surface of the disk-shaped information carrier (3).

19 Claims, 3 Drawing Sheets

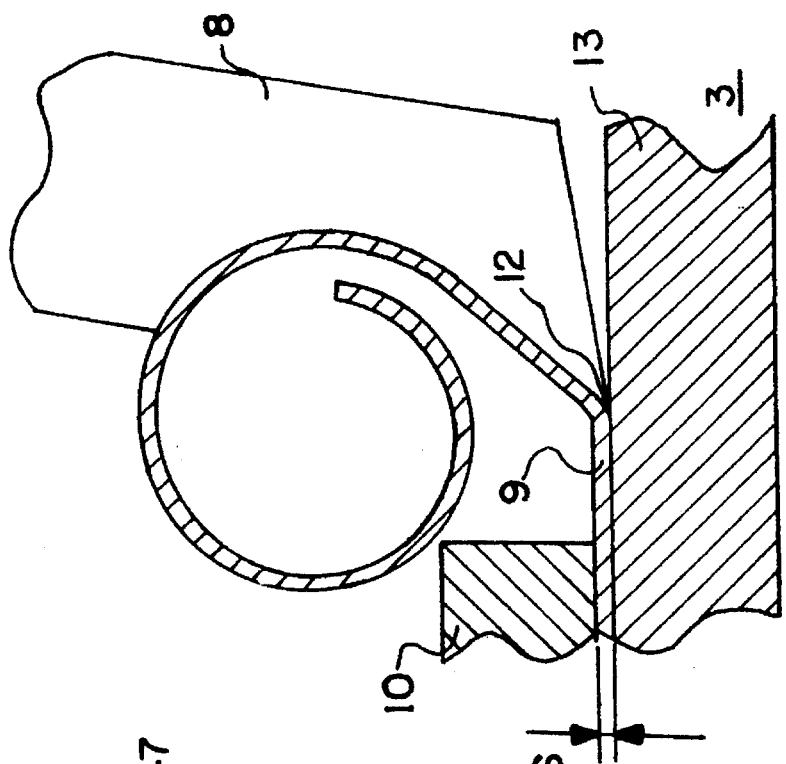
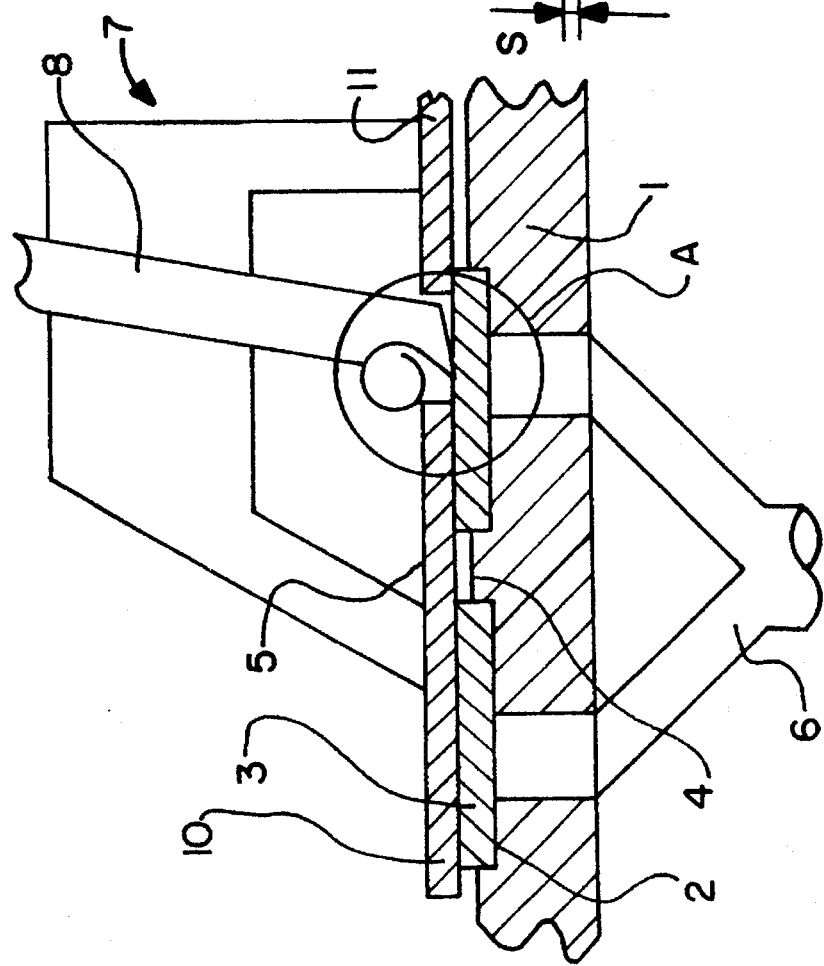

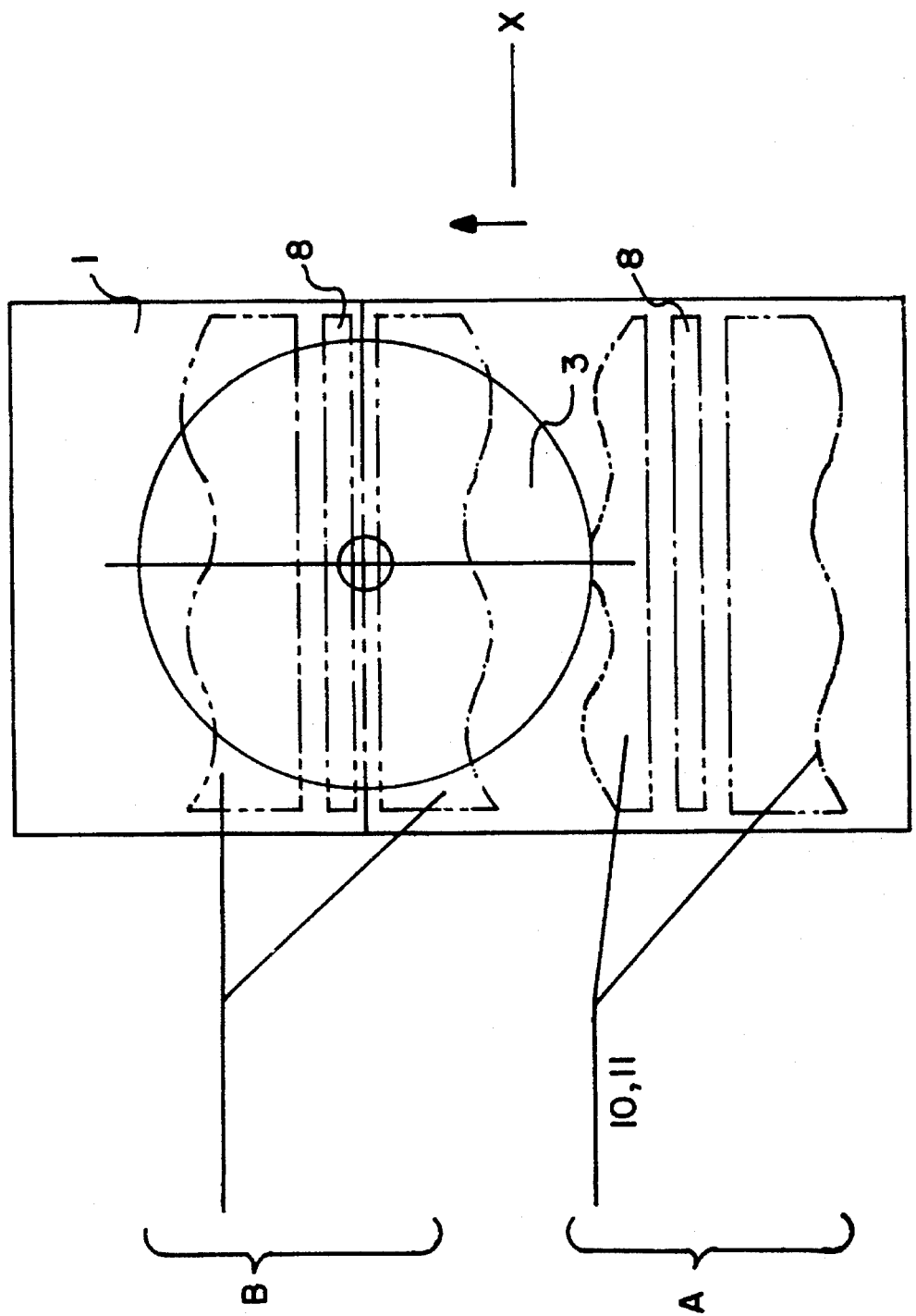

PROCESS AND DEVICE FOR MECHANICALLY REMOVING A LAYER FROM THE SUBSTRATE MATERIAL OF A DISK-SHAPED INFORMATION CARRIER

The invention relates to a process for mechanically removing foreign substances from the substrate material of a disk-shaped information carrier, especially of an optically scannable information carrier, for the recovery of the substrate material. The invention further relates to a device for the realization of the process.

The manufacture of such types of disk-shaped information carriers, such as optically readable video disks or digital audio disks (compact disks), is currently managed only with a relatively high reject rate, so that approx. 50% of the original raw material used ends up as reject material. In order to reduce the quantity of waste, it has therefore been proposed to recover the substrate material for the disk-shaped information carriers, generally polycarbonate, to enable it to be used again, after granulation, for the manufacture of disk-shaped information carriers. For this it is necessary that the foreign substances, which regularly extend, in the said information carriers, across the entire surface of the information carrier on one side, should be reliably removed so as to enable the substrate material to be available for reuse at the required level of purity.

The foreign substances on a compact disk comprise a metal layer, a varnish layer and an ink impression. It has been proposed to remove these foreign substances by chemical means. Further waste disposal problems are herein generated by the aggressive chemical materials which are used.

It has further been proposed to remove the foreign substances by mechanical means, to be precise by the use of a particle-jet or an abrasive tool which results in the foreign material being ground off. These processes too have failed to produce the desired success.

The object of the invention is therefore to enable a reliable, mechanical removal of the foreign substances from the substrate material of disk-shaped information carriers, in which no new waste disposal problems are to be generated by the removal of the foreign substances.

This object is achieved according to the invention, using a process of the type mentioned in the introduction, by the fact that the foreign substances-containing coating are [sic] removed from the substrate material by a metal-removing cut.

The concept forming the basis of the invention accordingly consists in removing the foreign substances-containing layer by a cut having a defined depth of cut, the cut being able to extend across the entire width of the information carrier, so that, using a single drawing cut, the entire foreign substances-containing coating of the substrate material is peeled off.

For the realization of the process according to the invention, no pollutant auxiliary materials, such as chemicals or abrasive grainy materials, are necessary. The foreign substances-containing layer is yielded in the form of chips and can then be crushed and disposed of. The disk, made from the substrate material, which has been freed from the foreign substances, is available for use in a pure form having a relatively high surface quality, which can be further enhanced by the top side, at least, of the disk-shaped information carrier, which top side exhibits the foreign substances, being moistened prior to the cut. The moistening can also herein apply, however, to the entire information carrier.

The critical observance of the defined depth of cut is aided by the fact that, during the cut, the information carrier is pressed from its top side, for positional fixing purposes, into a receiving fixture. The receiving fixture, which is formed by an indentation, has preferably in this case a diameter which corresponds to the outside diameter of the disk-shaped information carrier. The pressing of the information carrier into the receiving fixture produces a secure positioning of the information carrier during the cut.

Preferably, a cutting angle of ±10° is used. In particular where a negative cutting angle is applied, it is possible to obtain a high surface quality for the remaining substrate material.

The information carrier is preferably additionally held in the receiving fixture by means of suckers acting upon the bottom side.

The depth of cut is expediently set such that it somewhat exceeds the thickness of the foreign substances-containing layer, so that a thin surface layer of the substrate material is likewise stripped away. The certainty of only pure substrate material being left and of being able to be reused is thereby increased.

The object forming the basis of the invention is further achieved by a device for the realization of the process, which device comprises a tool bottom part, having a receiving fixture for the fixing of the disk-shaped information carrier, and a tool top part, which is displaceable relative to the tool bottom part parallel to its surface and has a blade which peels away a layer from the surface. The blade preferably herein, exhibits, transversely to its direction of motion, a width which is greater than or equal to the diameter of the information carrier, thereby enabling the foreign substances-containing layer to be peeled off in one cut.

In a constructionally preferred embodiment of the device according to the invention, a hold-down clamp is provided, which is guided on the surface of the information carrier and is disposed in front of the blade in the direction of cut. This hold-down clamp can be supplemented by an additional hold-down clamp which trails the blade. The hold-down clamp, especially the leading hold-down clamp, exhibits preferably the width of the blade and can be configured to have such a length that it is able to lie with virtually its full surface on the information carrier.

It can be advantageous to advance the arrangement of hold-down clamp and blade, prior to the motion in the direction of cut, perpendicular to the surface of the information carrier onto this surface, so as to enable the receiving fixture to be favorably loaded with the disk-shaped information carriers. The cutting edge of the blade can herein exhibit, relative to the hold-down clamp, a defined lead distance, which determines the depth of cut. This arrangement has the advantage that different thicknesses of the optical information carriers, which thicknesses are attributable to different thicknesses of the substrate material, whilst the thickness of the foreign substances-containing layer is virtually always the same, are automatically compensated. Alternatively, it is also however possible to work with a constant depth of cut which is set relative to the tool bottom part, in which case the depth of cut is set such that the foreign substances-containing coating, given the minimum thickness of the substrate material within the defined tolerance range, is peeled off. For thicker substrate materials, a corresponding layer of the substrate material is in this case peeled off with it.

It is advantageous for the depth of the receiving fixture in the tool bottom part to be configured smaller than the minimum thickness of the information carrier minus the depth of cut. This has the result that the cutting edge of the blade can be moved securely, at a distance from the top side of the tool bottom part, parallel to this top side, without there being any risk of contact between the blade and the tool bottom part.

For the suctional fixing of the disk-shaped information carrier in the receiving fixture, vacuum lines can be configured in the tool bottom part, which emerge in the base of the receiving fixture.

A further fixing of the disk-shaped information carrier can be achieved by the fact that a middle centering bolt of the receiving fixture juts into a center-hole in the inserted disk-shaped information carrier.

The invention is particularly suitable for the removal of foreign substances-containing layers of compact disks, on which the foreign substances are present in a coating found on one side of the substrate material. It is also however possible to use the invention in respect of disk-shaped carriers coated on both sides, in which case both surfaces of the disk-shaped carrier would have to be treated in the manner according to the invention or with a device according to the invention.

Preferred cutting angles are +4° to +8° or −4° to −8°. In test arrangements, the best results were achieved with cutting angles of +4° to +6° or −4° to −6°.

Figure 5:
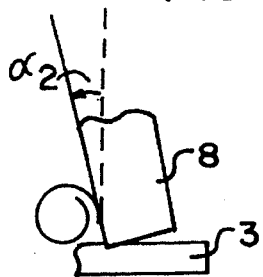
Figure 6:
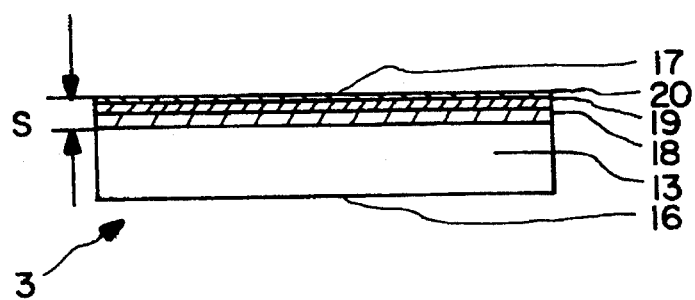

The invention is to be explained in greater detail below with reference to illustrative embodiments represented in the drawing, in which:

FIG. 1 shows a vertical section through an arrangement comprising a tool top part and tool bottom part, exhibiting an inserted disk-shaped in-formation carrier, FIG. 2 shows a detail A from FIG. 1, FIG. 3 shows a diagrammatic top view of the arrangement according to FIG. 1, two work settings being indicated, FIG. 4 shows a diagrammatic representation of the cutting conditions for the blade moved across the information carrier, FIG. 5 shows a diagrammatic representation of a negative cutting angle, and FIG. 6 shows the layers of a compact disk type of disk-shaped information carrier.

FIG. 1 reveals a tool bottom part 1 in which there is located a receiving fixture 2, in the form of a round recess, into which there is inserted a disk-shaped information carrier 3 in the form of a compact disk. The centering is served by a centric centering bolt 4 of the receiving fixture, which centering bolt juts partially into a center-hole in the compact disk. In the region of the receiving fixture 2, the tool bottom part 1 exhibits vacuum lines 6, in which an underpressure can be generated, so that the compact disk 3 is sucked onto the base of the receiving fixture 2. The suction lines 6 emerging in the base are disposed concentrically around the middle bolt 4.6, 8 or more such suction lines can be provided.

FIG. 1 further reveals a tool top part 7 in its work setting, in which a blade 8 fastened to the tool top part 7 removes a layer 9 from the top side of the compact disk 3 by machine-cutting. The blade 8, which is guided from right to left in FIG. 1, is guided behind a front hold-down clamp 10 and in front of a trailing hold-down clamp 11. The hold-down clamps 10, 11 prevent the compact disk 3 from lifting out of the receiving fixture 2.

FIG. 2 reveals that the depth of cut S derives from a fixed-set difference between the bottom side of the front hold-down clamp 10 and the depth of a front cutting edge 12 of the blade 8. The depth of cut S also therefore determines the thickness of that layer 9 of the substrate material 13 of the compact disk 3 which is peeled off by the blade 8.

FIG. 3 illustrates that the tool top part 7, having the blade 8 and the two hold-down clamps 10, 11, is guided out of an original setting denoted by A in FIG. 3, parallel to the top side of the work bottom part 1, in the direction of cut X, there being portrayed in FIG. 3 a work setting in which the blade 8 is located, in the direction of cut, closely behind the middle of the compact disk 3.

For the holding down of the compact disk 3 in the receiving fixture 2, the leading hold-down clamp 10 is of greater importance than the trailing hold-down clamp 11.

FIG. 4 illustrates a form of the blade 8, which exhibits at the front, above a front cutting edge in the direction of cut, a chip-receiving chamber 14. Referred to as the cutting angle 1 of the blade 8 is the angle between the perpendicular to the surface of the compact disk 3 and the inclination 15 of the leading flank of the cutting edge 12. The angle between the bottom side of the tool and the top side of the tool bottom part 1 is referred to as the clearance angle.

Cutting angles between +10° and −10° have proved to be advantageous. FIG. 4 shows, in exaggerated representation, a positive cutting angle 1, whilst FIG. 5 illustrates a negative cutting angle −2, which corresponds to a machine-cutting scraping operation.

The configuration of a negative cutting angle −2 holds advantages for the surface quality of the remaining substrate material 13.

FIG. 6 illustrates the conventional structure of a compact disk 3, which exhibits a scanning side 16 on the side of the substrate material 13 and an opposite printed surface 17 which—starting from the substrate material 13—is formed by a metal layer 18, a varnish layer 19 and an ink impression 20 for the label.

FIG. 6 reveals that the depth of cut S is set such that all layers 18, 19, 20 are securely removed and that a thin layer of the substrate material 13, also, is peeled off in order to retain a pure substrate material 13 which can be put to good use.

I claim:

1. A device for mechanically removing a foreign substance-containing layer from a hard polycarbonate substrate material of a disk-shaped information carrier, comprising:

a tool bottom part having a surface provided with a receiving fixture in a form of an indentation of a shape corresponding to a shape of the disk-shaped information carrier for fixing the disk-shaped information carrier;

a tool top part having a blade and being displaceable along a path parallel to, and spaced from the surface of the tool bottom part so as to cut the disk-shaped information carrier in a cutting direction parallel to the surface of the tool bottom part by a pre-determined depth of cut, said tool top part being further provided with a hold-down clamp which is guided on the disk-shaped information carrier during a cut and which is disposed in front of the blade in the cutting direction.

2. A device according to claim 1, further comprising an additional hold-down clamp which trails the blade in the cutting direction.

3. A device according to claim 1, wherein the blade has a width which is greater than or equal to a diameter of the disk-shaped information carrier.

4. A device according to claim 3, wherein the hold-down clamp has a width corresponding to the width of the blade.

5. A device according to claim 4, wherein the hold-down clamp has a minimum length which corresponds, in order of magnitude, to a diameter of the disk-shaped information carrier.

6. A device according to claim 1, wherein an arrangement of the hold-down clamp and blade, prior to motion in the cutting direction, are moveable perpendicular to a surface of the disk-shaped information carrier and onto said surface of the disk-shaped information carrier.

7. A device according to claim 1, wherein a cutting edge of the blade is positioned a defined lead distance relative to the hold-down clamp, said lead distance determining the depth of cut.

8. A device according to claim 1, further comprising vacuum lines configured in the tool bottom part and emerging in the receiving fixture.

9. A device according to claim 1, wherein the receiving fixture has a middle centering bolt which is positioned to jut into a center-hole in the disk-shaped information carrier.

10. A device according to claim 1, wherein the cut to remove the foreign substance-containing layer is a single draw cut.

11. A device for mechanically removing a foreign substance-containing layer from a substrate material of a disk-shaped information carrier, comprising:

a tool bottom part having a surface provided with a receiving fixture in a form of an indentation of a shape corresponding to a shape of a disk-shaped information carrier for fixing said disk-shaped information carrier;

a tool top part having a blade and being displaceable along a path parallel to, and spaced from the surface of the tool bottom part so as to cut the disk-shaped information carrier in a cutting direction parallel to the surface of the tool bottom part by a pre-determined depth of cut, said tool top part being further provided with a hold-down clamp which is guided on the disk-shaped information carrier during a cut and is disposed in front of the blade in the cutting direction.

12. A device according to claim 11, wherein the hold-down claim has a width corresponding to the width of the blade.

13. A device according to claim 12, wherein the hold-down clamp has a minimum length which corresponds, in order of magnitude, to a diameter of the disk-shaped information carrier.

14. A device according to claim 11, wherein an arrangement of the hold-down clamp and blade, prior to motion in the cutting direction are moveable perpendicular to a surface of the disk-shaped information carrier onto said surface of the disk-shaped information carrier.

15. A device according to claim 11, wherein a cutting edge of the blade is positioned a defined lead distance relative to the hold-down clamp, a said lead distance determining the depth of cut.

16. A device according to claim 11, further comprising an additional hold-down clamp which trails the blade in the cutting direction.

17. A device according to claim 11, further comprising vacuum lines configured in the tool bottom part and emerging in the receiving fixture.

18. A device according to claim 11, wherein the receiving fixture has a middle centering bolt which is positioned to jut into a center-hole in the disk-shaped information carrier.

19. A device according to claim 9, wherein the blade has a width which is greater than or equal to a diameter of the disk-shaped information carrier.

* * * * *